US012171710B1

(12) United States Patent
Huang et al.

(10) Patent No.: US 12,171,710 B1
(45) Date of Patent: Dec. 24, 2024

(54) MASSAGE DEVICE

(71) Applicant: Junpeng Wu, Shenzhen (CN)

(72) Inventors: Tenghui Huang, Guangdong (CN); Junpeng Wu, Shenzhen (CN)

(73) Assignee: Junpeng Wu, Shenzhen (CN)

( * ) Notice: Subject to any disclaimer, the term of this patent is extended or adjusted under 35 U.S.C. 154(b) by 0 days.

(21) Appl. No.: 18/648,505

(22) Filed: Apr. 29, 2024

(30) Foreign Application Priority Data

Apr. 17, 2024 (CN) ......................... 202420806122.9

(51) Int. Cl.
*A61H 19/00* (2006.01)
*A61H 23/02* (2006.01)

(52) U.S. Cl.
CPC ............. *A61H 19/44* (2013.01); *A61H 19/34* (2013.01); *A61H 23/0254* (2013.01); *A61H 2201/0153* (2013.01); *A61H 2201/1215* (2013.01); *A61H 2201/149* (2013.01); *A61H 2201/1669* (2013.01)

(58) Field of Classification Search
CPC ........ A61H 19/40; A61H 19/44; A61H 19/50; A61H 19/34; A61H 23/00; A61H 23/006; A61H 23/02; A61H 21/00
See application file for complete search history.

(56) References Cited

U.S. PATENT DOCUMENTS

| | | | | |
|---|---|---|---|---|
| 2017/0105896 A1* | 4/2017 | Derwin | .................. | A61H 19/34 |
| 2018/0042809 A1* | 2/2018 | Zipper | .................. | A61H 19/44 |

* cited by examiner

*Primary Examiner* — Margaret M Luarca
*Assistant Examiner* — Nathan M Le

(57) ABSTRACT

A massage device includes a first massage part and a second massage part, which are configured to be inserted into a vagina or a rectum, and a driving mechanism, which is connected to both the first massage part and the second massage part. The driving mechanism is configured to drive the first massage part and the second massage part respectively to perform reciprocating linear motion simultaneously in opposite directions.

18 Claims, 10 Drawing Sheets

MASSAGE DEVICE

CROSS-REFERENCE TO RELATED APPLICATIONS

The present application claims priority of Chinese Patent Application No. 202420806122.9, filed on Apr. 17, 2024, the entire contents of which are hereby incorporated by reference.

TECHNICAL FIELD

The present disclosure relates to the technical field of medical equipment, and in particular to a massage device.

DESCRIPTION OF THE PRIOR ART

There is known from the prior art device for massage and sexual stimulation including an elongated member for vaginal stimulation. In use, the user inserts the elongated member into the vagina and moves the elongated member back and forth to stimulate the vagina. However, the hand of the user may feel sore and weak and such devices have low stimulation efficiency.

SUMMARY OF THE DISCLOSURE

In view of this, the object of the present disclosure is to provide a massage device with high stimulation efficiency, improving the user experience.

In order to achieve the above object, the present disclosure provides a massage device, including a first massage part and a second massage part, which are configured to be inserted into a vagina or a rectum, and a driving mechanism, which is connected to both the first massage part and the second massage part. The driving mechanism is configured to drive the first massage part and the second massage part respectively to perform reciprocating linear motion simultaneously in opposite directions.

Compared with the existing massage devices, the massage device of the present disclosure includes two massage parts inserted into the vagina/rectum: the first massage part and the second massage part, and the first massage part and the second massage part are driven by the driving mechanism to perform reciprocating linear motion simultaneously in opposite directions, so as to stimulate the vagina/rectum, improving the stimulation efficiency and sexual experience.

DESCRIPTION OF EMBODIMENTS

Reference throughout this specification to "one embodiment", "an embodiment", "some embodiments", "embodiments", or similar language means that a particular feature, structure, or characteristic described in connection with the embodiment is included in at least one embodiment of the present disclosure. Thus, appearances of the phrases "in one embodiment", "in an embodiment", "in some embodiments", "in embodiments" and similar language throughout this specification may, but do not necessarily, all refer to the same embodiment.

The terminology used herein is for the purpose of describing particular embodiments only and is not intended to be limiting of this disclosure. As used herein, the singular forms "a", "an", and "the" are intended to include the plural forms as well, unless the context clearly indicates otherwise.

Furthermore, the use of the terms "a", "an", etc., do not denote a limitation of quantity, but rather denote the presence of at least one of the referenced items. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

For the purposes of disclosure, the word "substantially" is defined as "for the most part", it means "to a great extent", but having some room for some minor variation.

Moreover, the described features, structures, or characteristics of the disclosure may be combined in any suitable manner in one or more embodiments. Features, structures, or characteristics of one embodiment can be mixed and matched with features, structures, or characteristics of another embodiment. It will be apparent to those skilled in the art that various modifications and variations can be made to the present disclosure without departing from the spirit and scope and purpose of the disclosure. Thus, it is intended that the present disclosure cover the modifications and variations of this disclosure provided they come within the scope of the appended claims and their equivalents. Reference will now be made in detail to the preferred embodiments of the disclosure.

Figure 1:
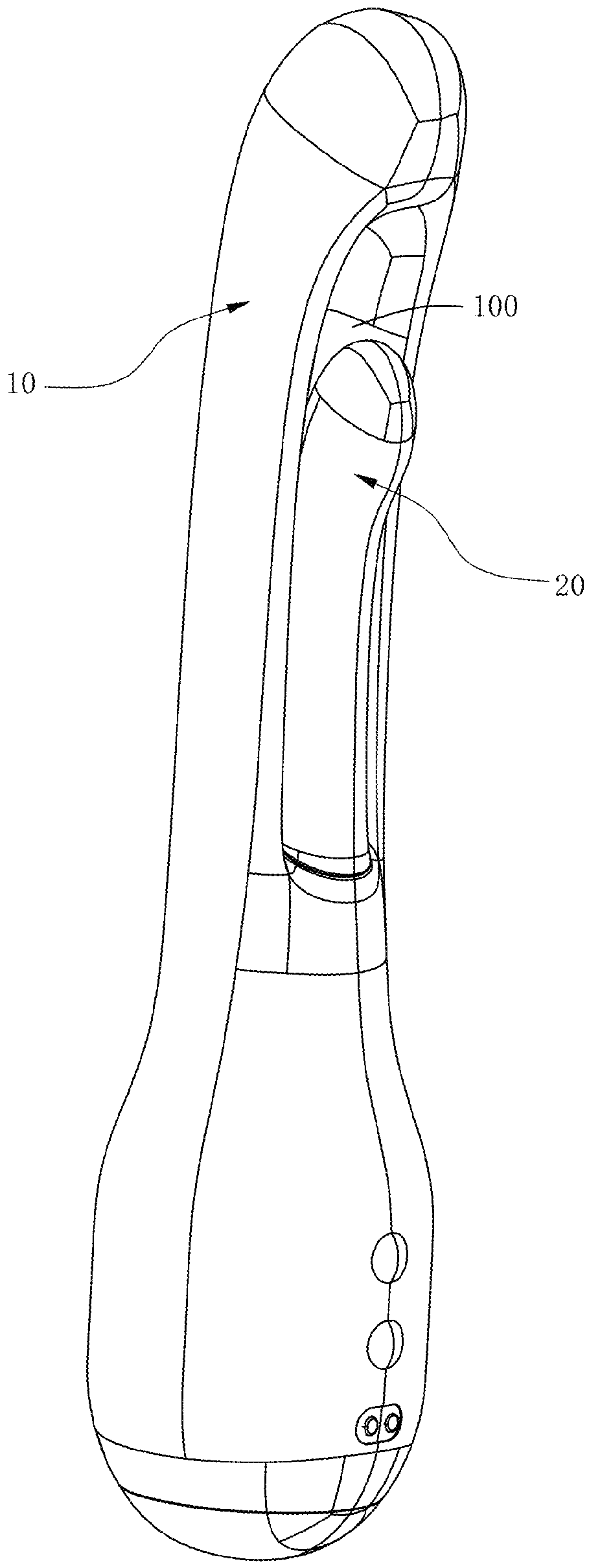
FIG. 1 is a schematic perspective view of a massage device according to an embodiment of the present disclosure.
Figure 2:
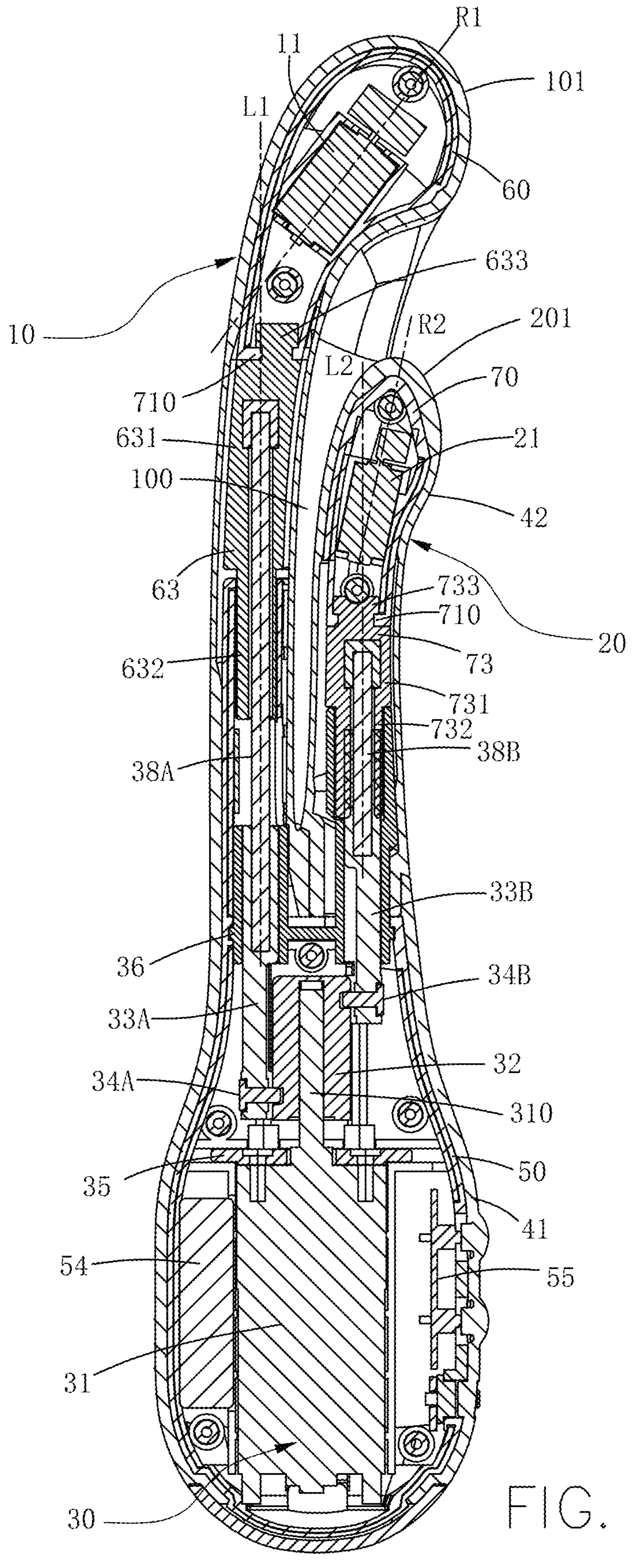
FIG. 2 is a cross-sectional view of the massage device shown in FIG. 1.

Referring to FIGS. 1 and 2, a massage device according to an embodiment of the present disclosure includes a first massage part 10, a second massage part 20 and a driving mechanism 30. Both the first massaging part 10 and the second massaging part 20 are configured to be inserted into the vagina or rectum. The driving mechanism 30 is connected to both the first massaging part 10 and the second massaging part 20 and configured to drive the first massaging part 10 and the second massaging part 20 to perform reciprocating linear motion simultaneously in the opposite direction. In other words, both the first massaging part 10 and the second massaging part 20 can perform reciprocating linear motion (move back and forth) respectively, and when the first massaging part 10 moves in a first direction (for example, in a direction away from the driving mechanism 30), the second massaging part 20 moves in a second direction (for example, in a direction towards the driving mechanism 30) opposite to the first direction; and when the first massaging part 10 moves in the second direction, the second massaging part 20 moves in the first direction opposite to the second direction.

Compared with the existing massage devices, the massage device of the present disclosure includes two massage parts inserted into the vagina/rectum: the first massage part 10 and the second massage part 20, and the first massage part 10 and the second massage part 20 are driven by the driving mechanism 30 to perform reciprocating linear motion simultaneously in opposite directions, so as to stimulate the vagina/rectum, improving the stimulation efficiency and sexual experience.

Figure 4:
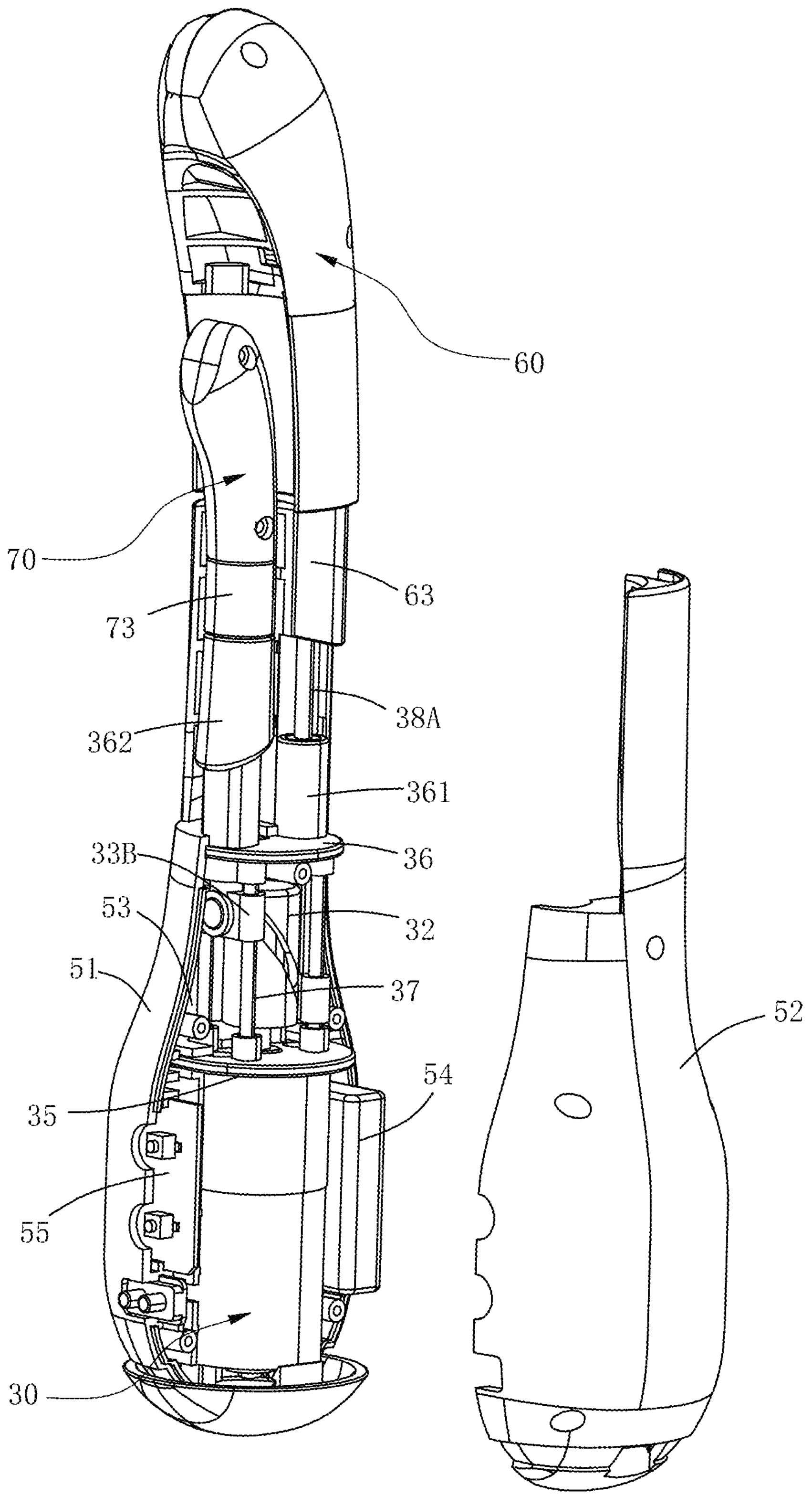
FIG. 4 is an exploded view of the internal structure of the massage device shown in FIG. 3.

Referring to FIGS. 2 and 4, the massage device according to this embodiment specifically includes an outer housing assembly 40, a handle support assembly 50, a first support assembly 60 and a second support assembly 70. The outer housing assembly 40 is made of a flexible material, preferably silicone rubber. The handle support assembly 50, the first support assembly 60 and the second support assembly 70 are made of a hard material, for example, plastic. The outer housing assembly 40 covers the handle support assembly 50, the first support assembly 60 and the second support assembly 70.

In this embodiment, the outer housing assembly 40 includes a first housing 41 and a second housing 42 formed in separate pieces. The first housing 41 includes a handle portion 411 and an elongate portion 412 connected to the front end of the handle portion 411. The handle support assembly 50 includes a main portion 501 and a connection portion 502 connected to the front end of the main portion 501. The first support assembly 60 is movably inserted into the connection portion 502 and connected to the driving mechanism 30. The second support assembly 70 is located at the front end of the main portion 501 and connected to the driving mechanism 30.

The handle portion 411 of the first housing 41 covers the main portion 501 of the handle support assembly 50. The elongate portion 412 of the first housing 41 covers the connection portion 502 of the handle support assembly 50 and the first support assembly 60, wherein the part of the elongate portion 412 of the first housing 41 corresponding to the first support assembly 60 forms the first massage part 10. In other words, at least part of the elongate portion 412 of the first housing 41 forms the first massage part 10. The second housing 42 covers the second support assembly 70, wherein the part of the second housing 42 corresponding to the second support assembly 70 forms the second massage part 20. In other words, at least part of the second housing 42 forms the second massage part 20. That is, both the first massage part 10 and the second massage part 20 are made of a flexible material and are supported by the first support assembly 60 and the second support assembly 70 respectively.

In this embodiment, the first massage part 10 is elongated and generally shaped like a hollow rod. The first massage part 10 is configured to perform reciprocating linear motion in a first axis L1 extending in the length direction of the first massage part 10. Specifically, when the driving mechanism 30 drives the first support assembly 60 to move back and forth, the first massage part 10 is driven by the first support assembly 60 to perform reciprocating linear motion in the first axis L1.

In this embodiment, the first massage part 10 defines a groove 100 on one side thereof. The first massage part 10 has a first free end 101 away from the driving mechanism 30. Preferably, the first free end 101 of the first massage part 10 is slightly bent relative to the first axis L1. More preferably, the first free end 101 of the first massage part 10 is provided with a first vibration member 11 therein. The first vibration member 11 is preferably a vibration motor. Therefore, when the first massage part 10 performs reciprocating linear motion in the first axis L1, the first vibration member 11 can also vibrate to improve the stimulation effect. As shown in FIG. 2, the central axis R1 of the first vibration member 11 is deflected at an acute angle relative to the first axis L1.

The second massage part 20 is arranged aside the first massage part 10 and at least partially received in the groove 100. Similar to the first massage part 10, the second massage part 20 is also elongated and generally shaped like a hollow rod. The second massage part 20 also has a second free end 201 away from the driving mechanism 30. However, the first massage part 10 is longer than the second massage part 20 so that the first free end 101 is further away from the driving mechanism 30 than the second free end 201. The second massage part 20 is configured to perform reciprocating linear motion in a second axis L2 extending in the length direction of the second massage part 20. The first axis L1 is parallel to the second axis L2. Specifically, when the driving mechanism 30 drives the second support assembly 70 to move back and forth, the second massage part 20 is driven by the second support assembly 70 to perform reciprocating linear motion in the second axis L2.

Preferably, the second free end 201 of the second massage part 20 is slightly bent relative to the second axis L2. As shown in FIG. 2, the bend direction of the second free end 201 of the second massage part 20 is generally the same as the bend direction of the first free end 101 of the first massage part 10. More preferably, the second free end 201 of the second massage part 20 is provided with a second vibration member 21 therein. The second vibration member 21 is preferably a vibration motor. Therefore, when the second massage part 20 performs reciprocating linear motion in the second axis L2, the second vibration member 21 can also vibrate to improve the stimulation effect. As shown in FIG. 2, the central axis R2 of the second vibration member 21 is deflected at an acute angle relative to the second axis L2. However, the deflection angle of the second vibration member 21 is smaller than that of the first vibration member 11.

The handle support assembly 50 in this embodiment includes a first shell half 51 and a second shell half 52 (see FIG. 4) that are snapped with each other. The first shell half 51 and the second shell half 52 together form an accommodation chamber 53 for accommodating the driving mechanism 30. In addition, other components such as a battery 54 and a PCB board 55 can also be installed in the accommodation chamber 53.

Figure 5:
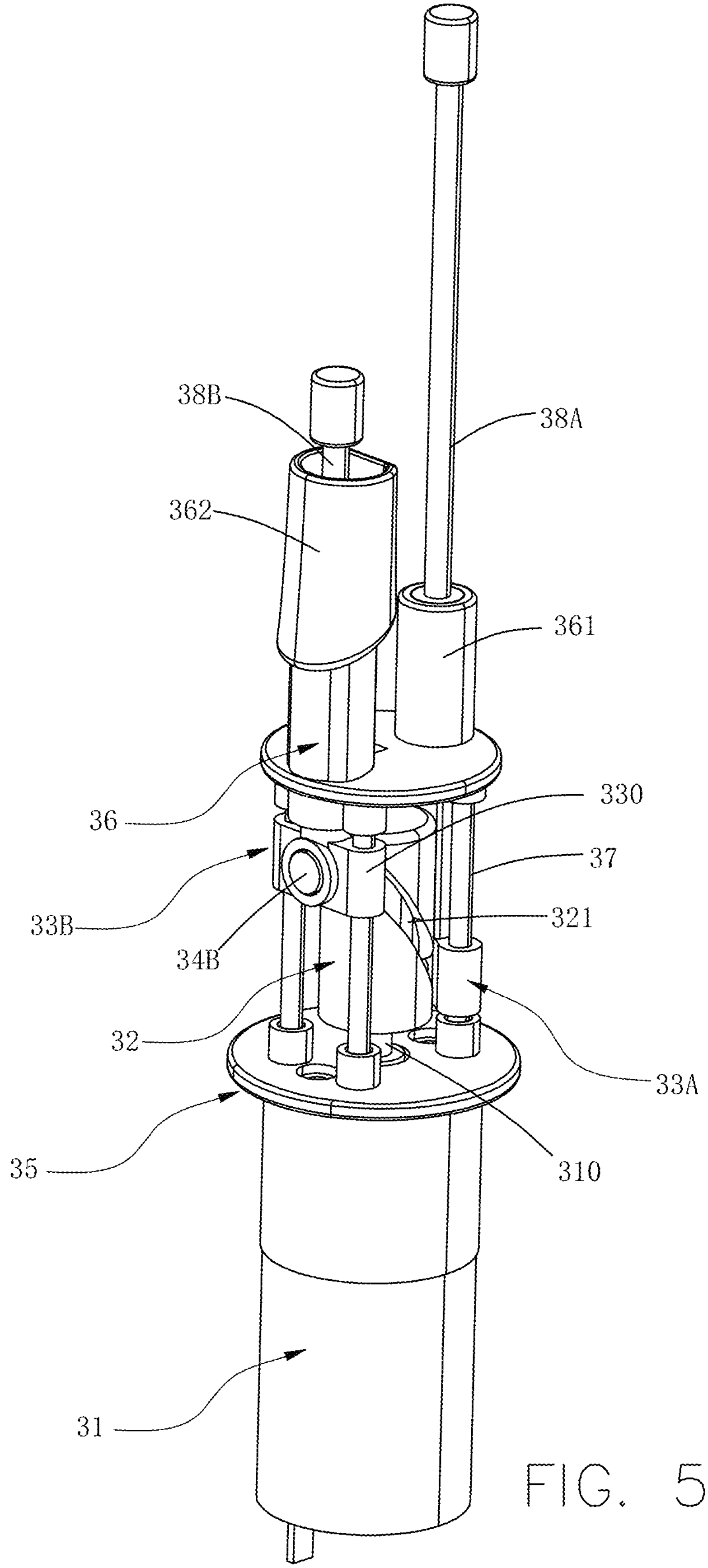
FIG. 5 is a perspective view of the driving mechanism of the massage device shown in FIG. 4.
Figure 6:
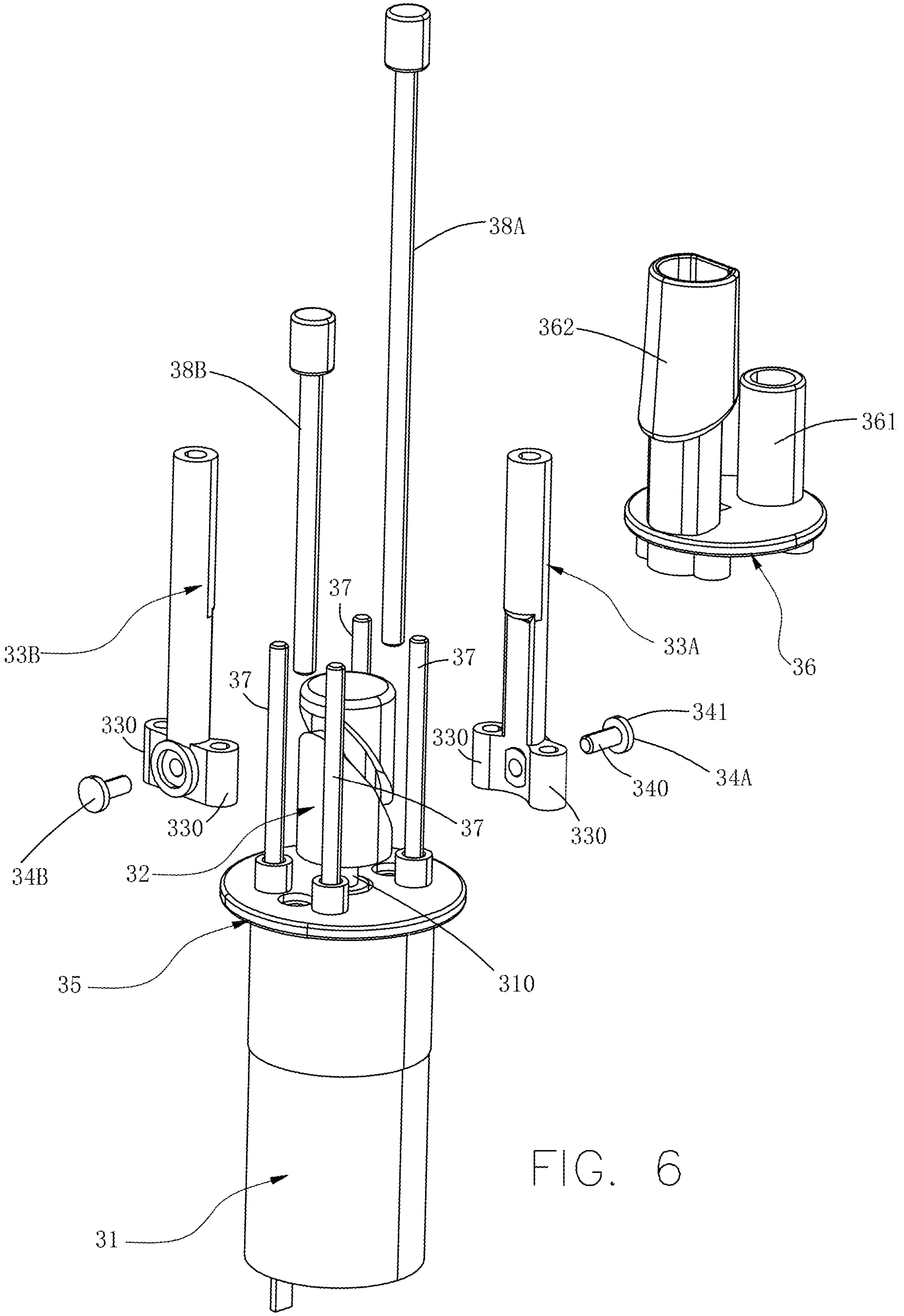
FIG. 6 is an exploded view of the driving mechanism shown in FIG. 5.
Figure 7A:
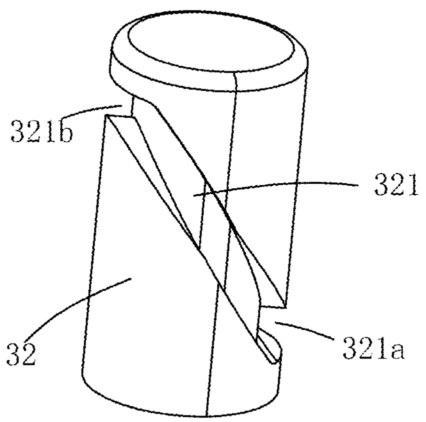
FIG. 7A is a perspective view of the threaded member of the driving mechanism shown in FIG. 6.
Figure 7B:
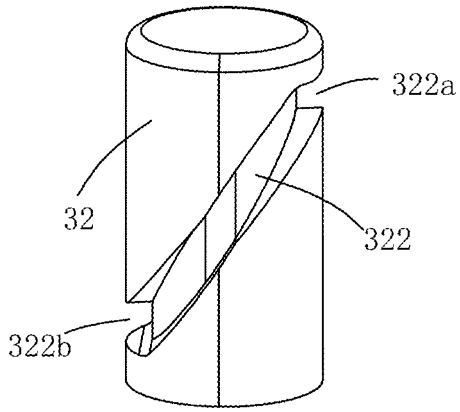
FIG. 7B is another perspective view of the threaded member shown in FIG. 7A.

Referring to FIGS. 5 and 6, in this embodiment, the driving mechanism 30 is configured to transform a rotary motion into the reciprocating linear motion of the first massage part 10 and the second massage part 20, and includes a driving source 31, a threaded member 32, a first slider 33A and a second slider 33B. The threaded member 32 is connected to the driving source 31 and is in a columnar shape. The first slider 33A and the second slider 33B are opposite to each other and connected to the threaded member 32. In this embodiment, the first slider 33A and the second slider 33B are both rod-shaped. The first slider 33A is connected to the first support assembly 60 and thus to the first massaging part 10, and the second slider 33B is connected to the second support assembly 70 and thus to the second massaging part 20. The driving source 31 is configured to drive the threaded member 32 to rotate, and the threaded member 32 is configured to drive the first slider 33A and the second slider 33B to perform reciprocating linear motion simultaneously in opposite directions, thereby realizing the reciprocating linear motion of the first massage part 10 and the second massage part 20.

In this embodiment, the driving source 31 is a motor, and its output shaft 310 is connected to the threaded member 32 and used to drive the threaded member 32 to rotate. For example, the threaded member 32 can define a non-circular hole (not shown), and the output shaft 310 can have a non-circular cross-sectional shape matched with the non-circular hole, so that when the output shaft 310 rotates, the threaded member 32 will rotate with the output shaft 310 synchronously. When the threaded member 32 rotates, the first slider 33A and the second slider 33B are driven to make reciprocating linear motion in opposite directions, whereby the first massage part 10 and the second massage part 20 will perform reciprocating linear motion in the opposite direction simultaneously.

Specifically, in this embodiment, the driving mechanism 30 further includes a first sliding guide member 34A fixedly connected with the first slider 33A and a second sliding guide member 34B fixedly connected with the second slider 33B. In this embodiment, the first sliding guide member 34A and the second sliding guide member 34B are both shaped like a rivet. Specifically, each of the first sliding guide member 34A and the second sliding guide member 34B includes an engagement shaft 340 and a cap 341 connected to one end of the engagement shaft 340.

As shown in FIGS. 5-7B, two outer surfaces of the threaded member 32 opposite to each other relative to the central axis of the threaded member 32 are respectively provided with a first helical groove 321 and a second helical groove 322. The first helical groove 321 and the second helical groove 322 are symmetrical to each other. The engagement shafts 340 of the first sliding guide member 34A and the second sliding guide member 34B radially pass through the first slider 33A and the second slider 33B respectively and are slidably engaged in the first helical groove 321 and the second helical groove 322 respectively. The caps 341 of the first sliding guide member 34A and the second sliding guide member 34B respectively abut against the sides of the first slider 33A and the second slider 33B away from the threaded member 32, so as to fix the first sliding guide member 34A and the second sliding guide member 34B to the first slider 33A and the second slider 33B respectively.

When the threaded member 32 rotates, the first sliding guide member 34A and the second sliding guide member 34B respectively slide in the first helical groove 321 and the second helical groove 322, and thus the rotary motion of the threaded member 32 is transformed into the linear motion of the first sliding guide member 34A and the second sliding guide member 34B, wherein when the first sliding guide member 34A moves linearly towards the driving source 31, the second sliding guide member 34B moves linearly away from the driving source 31; and when the first sliding guide member 34A moves linearly away from the driving source 31, the second sliding guide member 34B moves linearly towards the driving source 31.

Preferably, the start end 321*a* of the first helical groove 321 is communicated to the terminal end 322*b* of the second helical groove 322, and the terminal end 321*b* of the first helical groove 321 is communicated to the start end 322*a* of the second helical groove 322. That is, the first helical groove 321 and the second helical groove 322 each extends about 180°. Preferably, the start end 321*a* of the first helical groove 321 and the terminal end 322*b* of the second helical groove 322 are adjacent to the bottom of the threaded member 32, and the terminal end 321*b* of the first helical groove 321 and the start end 322*a* of the second helical groove 322 are adjacent to the top of the threaded member 32, thereby increasing the stroke of the first sliding guide member 34A and the second sliding guide member 34B. It can be seen that the first sliding guide member 34A and the second sliding guide member 34B can each slide in both the first helical groove 321 and the second helical groove 322, wherein when the first sliding guide member 34A is engaged in the first helical groove 321, the second sliding guide member 34B is engaged in the second helical groove 322; and when the first sliding guide member 34A is engaged in the second helical groove 322, the second sliding guide member 34B is engaged in the first helical groove 321.

For example, when the free end of the engagement shaft 340 of the first sliding guide member 34A is located in the first helical groove 321 and slides from the start end 321*a* of the first helical groove 321 (close to the driving source 31) toward the terminal end 322*b* of the first helical groove 321 (away from the driving source 31), the free end of the engagement shaft 340 of the second sliding guide member 34B is located in the second helical groove 322 and slides from the start end 322*a* of the second helical groove 322 (away from the driving source 31) toward the terminal end 322*b* of the second helical groove 322 (close to the driving source 31), thereby driving the first slider 33A to move away from the driving source 31 and the second slider 33B to move toward the driving source 31. When the free end of the engagement shaft 340 of the first sliding guide member 34A slides to the terminal end 321*b* of the first helical groove 321, the free end of the engagement shaft 340 of the first sliding guide member 34A then slides into the second helical groove 322 and slides from the start end 322*a* of the second helical groove 322 toward the terminal end 322*b* of the second helical groove 322, so that the first slider 33A moves toward the driving source 31. Similarly, when the free end of the engagement shaft 340 of the second sliding guide member 34B slides to the terminal end 322*b* of the second helical groove 322, the free end of the engagement shaft 340 of the second sliding guide member 34B then slides into the first helical groove 321, and slides from the start end 321*a* of the first helical groove 321 toward the terminal end 321*b* of the first helical groove 321, so that the second slider 33B moves away from the driving source 31. In this way, the first slider 33A and the second slider 33B move back and forth in opposite directions simultaneously.

In order to improve the stability of the reciprocating linear motion of the first slider 33A and the second slider 33B, preferably, the driving mechanism 30 further includes a first positioning member 35 and a second positioning member 36. The first positioning member 35 and the second positioning member 36 are opposite to each other and a plurality of guide rails 37 (four in this embodiment) are positioned between the first positioning member 35 and the second positioning member 36. The first positioning member 35 and the second positioning member 36 are respectively fixed to the handle support assembly 50 (see FIGS. 2 and 4). The first slider 33A and the second slider 33B are each slidably engaged with one or more guide rails 37. In this embodiment, the first slider 33A and the second slider 33B are each slidably engaged with two guide rails 37. Specifically, the first slider 33A and the second slider 33B are each provided with two opposite installation columns 330 (see FIGS. 5 and 6), and the guide rail 37 passes through the corresponding installation column 330 so that the corresponding slider 33A/33B can slide stably along the guide rail 37.

Preferably, the second positioning member 36 is provided with a first sleeve 361 and a second sleeve 362. The first slider 33A passes through the second positioning member 36 and is slidably received in the first sleeve 361. The second slider 33B passes through the second positioning member 36 and is slidably received in the second sleeve 362. Therefore, the reciprocating linear motion of the first slider 33A and the second slider 33B is more stable.

In this embodiment, the driving mechanism 30 further includes a first connecting shaft 38A and a second connecting shaft 38B. The first connecting shaft 38A is used to connect the first slider 33A and the first support assembly 60 (and thus connect the first slider 33A and the first massager part 10), and the second connecting shaft 38B is used to connect the second slider 33B and the second support assembly 70 (and thus connect the second slider 33B and the second massage part 20).

Figure 8A:
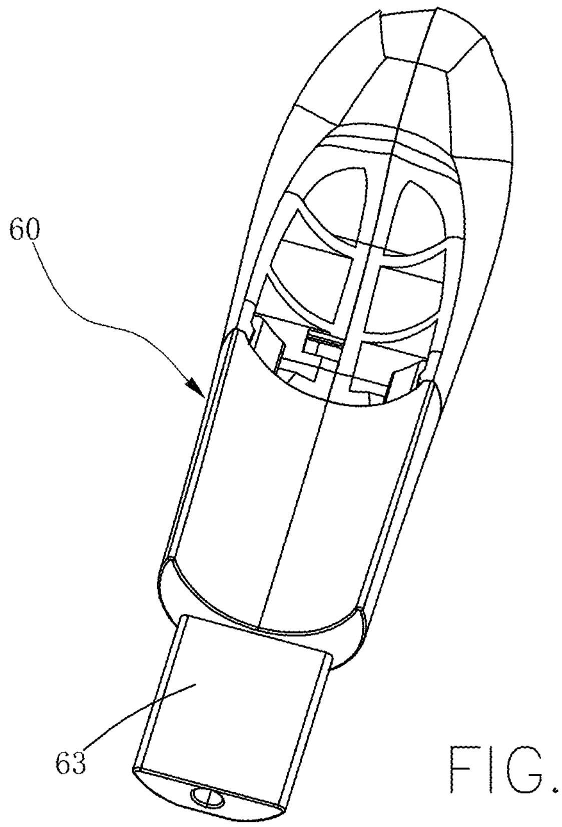
FIG. 8A is a perspective view of a first support assembly of the massage device shown in FIG. 3.
Figure 8B:
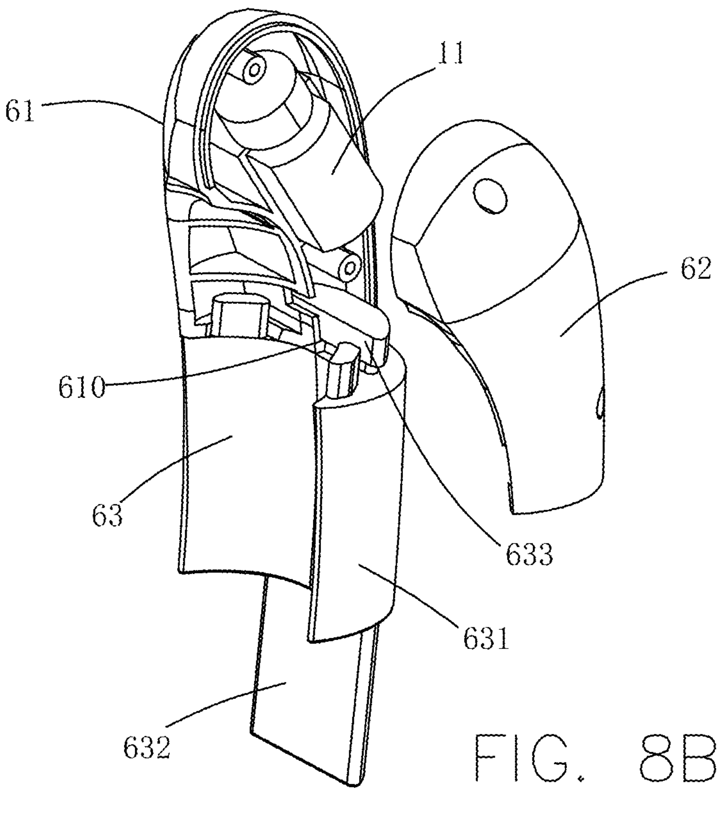
FIG. 8B is an exploded view of the first support assembly shown in FIG. 8A.

Referring to FIG. 2, FIG. 8A and FIG. 8B, in this embodiment, the first support assembly 60 includes a first support half-shell 61 and a second support half-shell 62 that are snapped with each other. The first support half-shell 61 and the second support half-shell 62 define a cavity for receiving the first vibration member 11. Preferably, the first support assembly 60 further includes a first vibration damping member 63. The first vibration damping member 63 is fixedly connected to the first support half-shell 61 and the second support half-shell 62, as well as the first connecting shaft 38A (for example, the first connecting shaft 38A can be inserted into the first vibration damping member 63 and fixedly connected with the first vibration damping member 63 through a shaft sleeve). The first vibration damping member 63 is preferably made of soft rubber material, which can isolate the first vibration member 11 from the first connecting shaft 38A and prevent the vibration of the first vibration member 11 from being transmitted to the driving mechanism 30.

Figure 3:
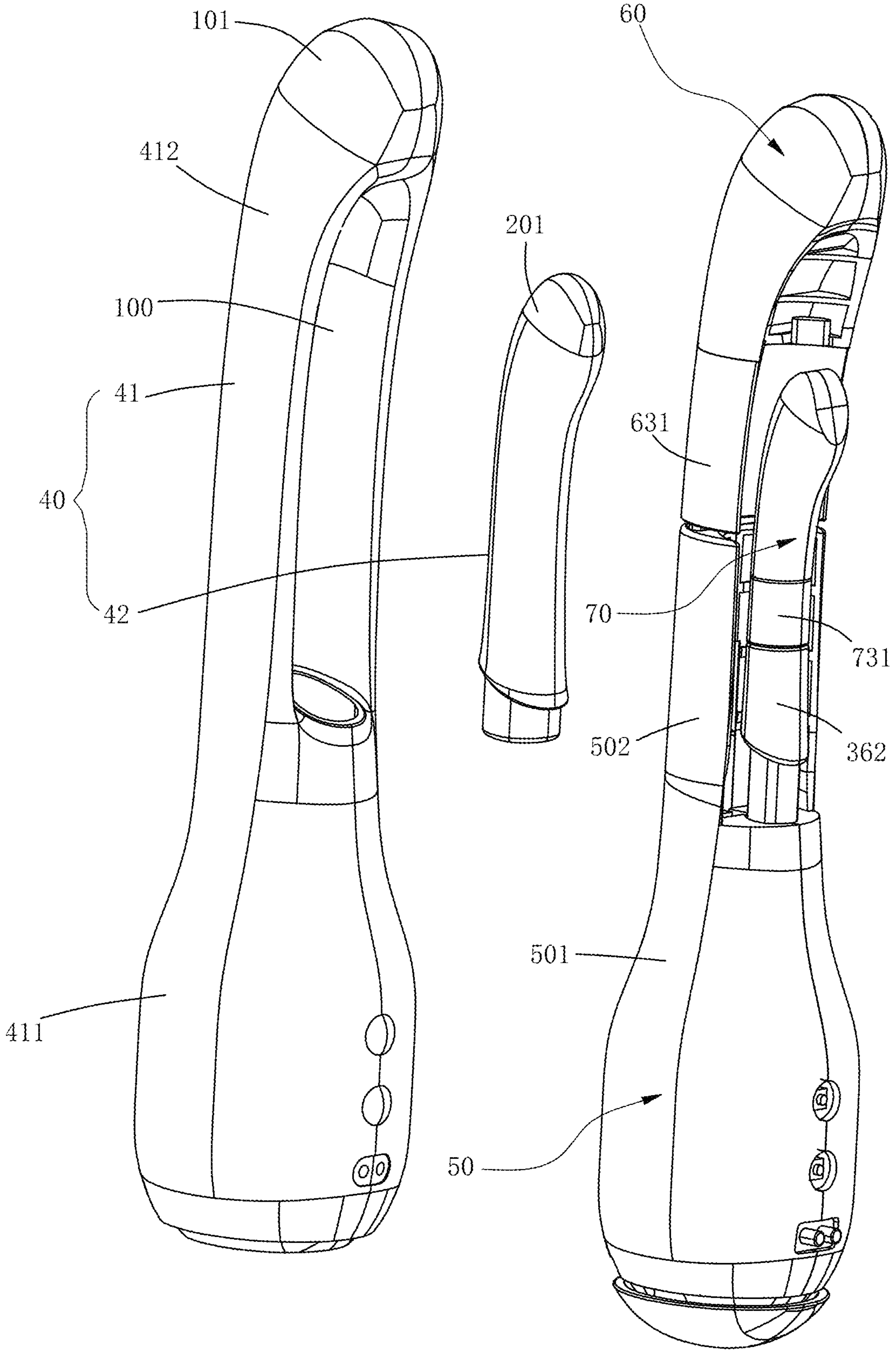
FIG. 3 is an exploded view of the massage device shown in FIG. 1.

Specifically, the first vibration damping member 63 includes a first section 631 and a second section 632 connected to the end of the first section 631 away from the first support half-shell 61 and the second support half-shell 62. The first section 631 is provided with a first protrusion 633 on the end facing the first support half-shell 61 and the second support half-shell 62. The first support half-shell 61 and the second support half-shell 62 define a first step 610. The first protrusion 633 is supported by the first step 610 so that the first vibration damping member 63 is fixedly connected to the first support half-shell 61 and the second support half-shell 62. As shown in FIGS. 2-4, the second section 632 of the first vibration damping member 63 is slidably inserted into the connection portion 502 of the handle support assembly 50, and the first connecting shaft 38A is inserted into the first section 631.

Figure 9A:
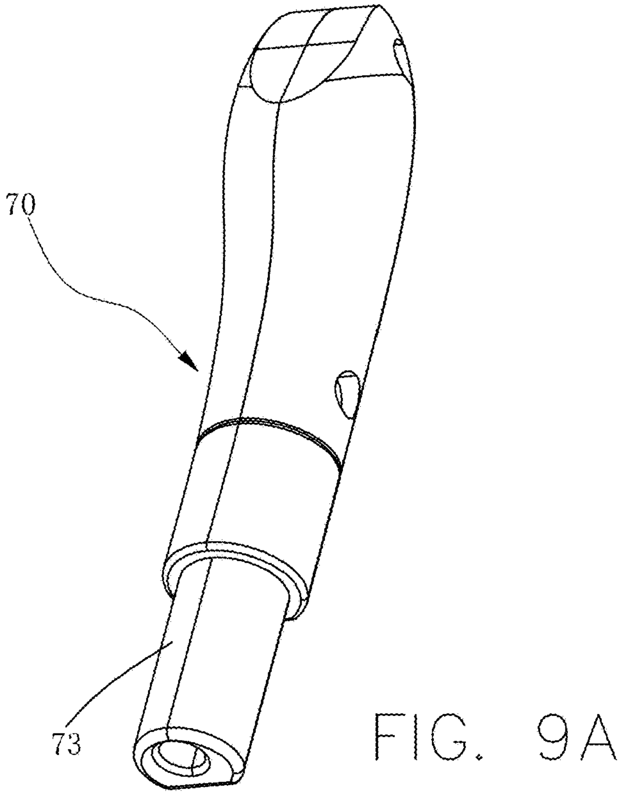
FIG. 9A is a perspective view of a second support assembly of the massage device shown in FIG. 3.
Figure 9B:
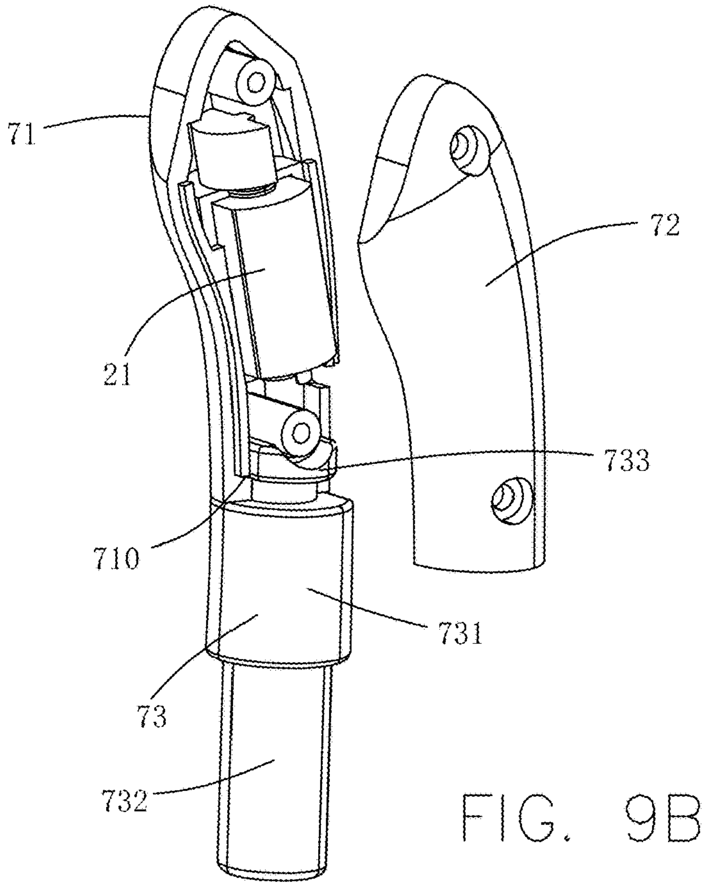
FIG. 9B is an exploded view of the second support assembly shown in FIG. 9A.

Referring to FIG. 2, FIG. 9A and FIG. 9B, in this embodiment, the second support assembly 70 includes a third support half-shell 71 and a fourth support half-shell 72 that are snapped with each other. The third support half-shell 71 and the fourth support half-shell 72 define a cavity for receiving the second vibration member 21. In this embodiment, the second support assembly 70 further includes a second vibration damping member 73. The second vibration damping member 73 is fixedly connected to the third support half-shell 71 and the fourth support half-shell 72, as well as the second connecting shaft 38B (for example, the second connecting shaft 38B can be inserted into the second vibration damping member 73 and fixedly connected with the second vibration damping member 73 through a shaft sleeve). The second vibration damping member 73 is preferably made of soft rubber material, which can isolate the second vibration member 21 from the second connecting shaft 38B and prevent the vibration of the second vibration member 21 from being transmitted to the driving mechanism 30.

Specifically, the second vibration damping member 73 includes a third section 731 and a fourth section 732 connected to the end of the third section 731 away from the third support half-shell 71 and the fourth support half-shell 72. The third section 731 is provided with a second protrusion 733 on the end facing the third support half-shell 71 and the fourth support half-shell 72. The third support half-shell 71 and the fourth support half-shell 72 define a second step 710. The second protrusion 733 is supported by the second step 710 so that the second vibration damping member 73 is fixedly connected to third support half-shell 71 and the fourth support half-shell 72. As shown in FIGS. 2-4, the fourth section 732 of the second vibration damping member 73 is slidably inserted into the second sleeve 362 of the second positioning member 36, and the second connecting shaft 38B is inserted into the third section 731.

Figure 10:
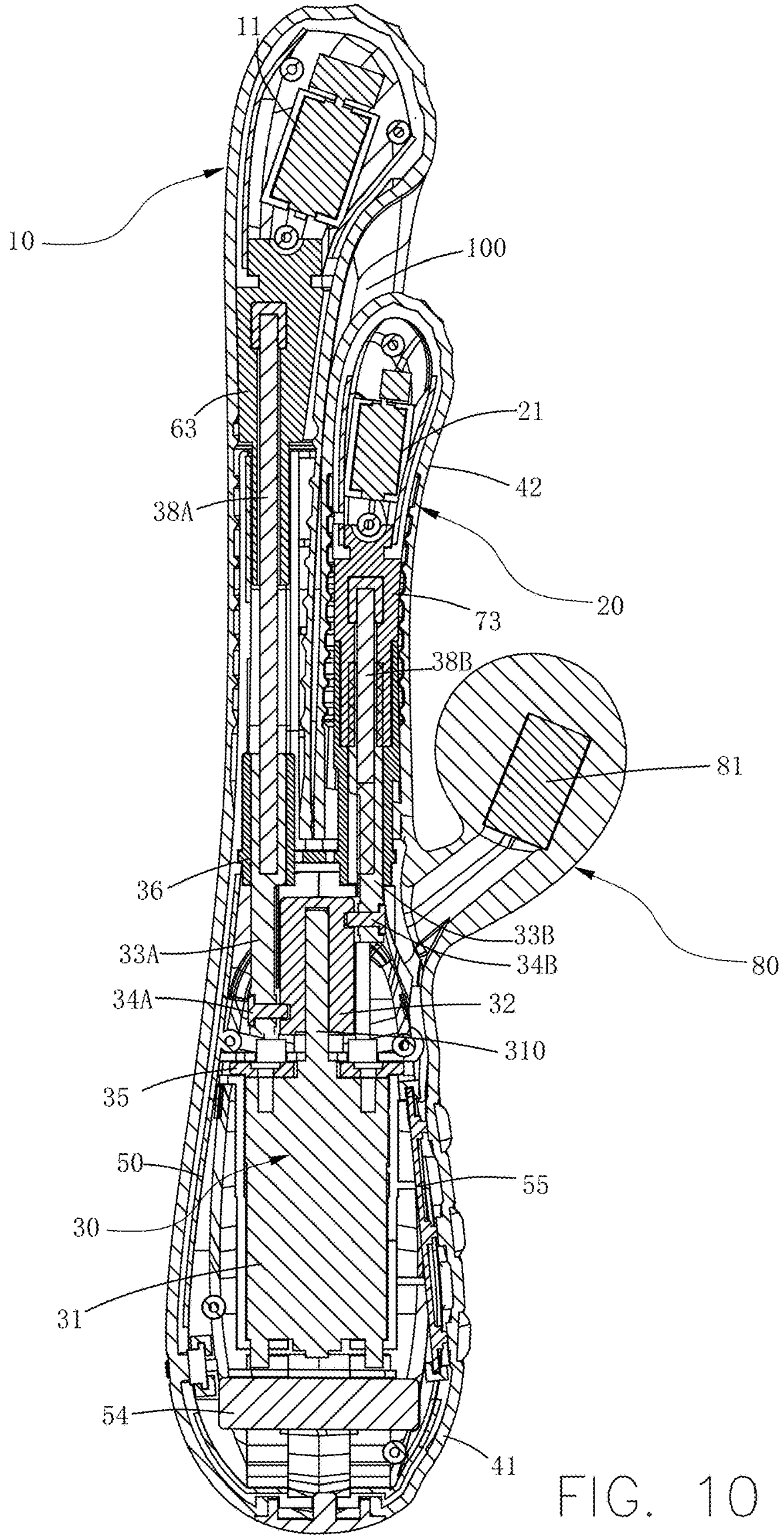
FIG. 10 is a cross-sectional view of another massage device according to another embodiment of the present disclosure.

Referring to FIG. 10, another massage device according to another embodiment of the present disclosure is almost the same as the above massage device, and the main difference therebetween is that the massage device as show in FIG. 10 further includes a third massage part 80 which is configured to stimulate the external genitalia region, for example, the clitoris.

Preferably, the third massage part 80 is roughly spherical in shape and made of a flexible material such as silicone rubber. In this embodiment, the third massage part 80 and the first housing 41 are formed in one piece. As shown in FIG. 10, the third massage part 80 in this embodiment is arranged between the handle portion 411 of the first housing 41 and the second housing 41. Preferably, the third massage part 80 is provided with a third vibration member 81 (for example, a vibration motor) therein, in order to improve the stimulate and massage effect.

While the disclosure has been particularly shown and described in conjunction with exemplary embodiments, it will be appreciated that variations and modifications will occur to those skilled in the art. The embodiments according to the present disclosure may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the disclosure.

The invention claimed is:

1. A massage device, comprising:

a first massage part and a second massage part, and a driving mechanism, which is connected to both the first massage part and the second massage part, wherein the driving mechanism is configured to drive the first massage part and the second massage part respectively to perform reciprocating linear motion simultaneously in opposite directions, wherein the driving mechanism is configured to transform a rotary motion into the reciprocating linear motion of the first massage part and the second massage part, and comprises a driving source, a threaded member, a first slider and a second slider, the driving source is configured to drive the threaded member to rotate, and the threaded member is configured to drive the first slider and the second slider to perform reciprocating linear motion simultaneously in opposite directions, wherein the first slider is connected to the first massage part, and the second slider is connected to the second massage part.

2. The massage device of claim 1, wherein both the first massage part and the second massage part are elongated, and the second massage part is disposed aside the first massage part.

3. The massage device of claim 1, wherein the first massage part defines a groove opened towards the second massage part, and the second massage part is at least partially disposed in the groove.

4. The massage device of claim 1, wherein the first massage part has a first free end away from the driving mechanism, and the second massage part has a second free end away from the driving mechanism, and wherein the first free end is further away from the driving mechanism than the second free end.

5. The massage device of claim 1, wherein the first massage part is configured to perform reciprocating linear motion in a first axis, the second massage part is configured to perform reciprocating linear motion in a second axis, and the first axis is parallel to the second axis.

6. The massage device of claim 1, wherein at least one of the first massage part and the second massage part is provided with a vibration member.

7. The massage device of claim 6, wherein the vibration member is a vibration motor.

8. The massage device of claim 6, wherein the first massage part is configured to perform reciprocating linear motion in a first axis, the first massage part is provided with a first vibration member at a free end thereof, and a central axis of the first vibration member is deflected at an angle relative to the first axis.

9. The massage device of claim 8, wherein the second massage part is configured to perform reciprocating linear motion in a second axis, the second massage part is provided with a second vibration member at a free end thereof, and a central axis of the second vibration member is deflected at an angle relative to the second axis.

10. The massage device of claim 1, wherein at least one of the first massage part and the second massage part is provided with a vibration damping member for connection with the driving mechanism.

11. The massage device of claim 10, wherein the vibration damping member is made of a flexible material.

12. The massage device of claim 1, wherein the driving mechanism further comprises a first sliding guide member connected to the first slider and a second sliding guide member connected to the second slider, two opposite outer surfaces of the threaded member respectively define a first helical groove and a second helical groove which are symmetrical to each other, the first sliding guide member and the second sliding guide member are slidably engaged in the first helical groove and the second helical groove respectively, and wherein when the first sliding guide member moves linearly towards the driving source, the second sliding guide member moves linearly away from the driving source; and when the first sliding guide member moves linearly away from the driving source, the second sliding guide member moves linearly towards the driving source.

13. The massage device of claim 12, wherein one end of the first helical groove is communicated to one end of the second helical groove, an other end of the first helical groove is communicated to an other end of the second helical groove, and wherein when the first sliding guide member is engaged in the first helical groove, the second sliding guide member is engaged in the second helical groove; and when the first sliding guide member is engaged in the second helical groove, the second sliding guide member is engaged in the first helical groove.

14. The massage device of claim 1, wherein the driving mechanism further comprises a first positioning member, a second positioning member and a plurality of guide rails positioned between the first and second positioning members, and the first slider and the second slider are each slidably engaged with one or more guide rails.

15. The massage device of claim 1, wherein the driving mechanism further comprises a first connecting shaft for connecting the first slider and the first massage part and a second connecting shaft the second slider and the second massage part.

16. The massage device of claim 15, wherein the first massage part is provided with a first vibration member and a first vibration damping member for connection with the first connecting shaft, and the second massage part is provided with a second vibration member and a second vibration damping member for connection with the second connecting shaft.

17. The massage device of claim 1, further comprising a third massage part which is configured to stimulate an external genitalia region.

18. The massage device of claim 17, wherein the third massage part is provided with a vibration member.

* * * * *